United States Patent Office 3,231,561
Patented Jan. 25, 1966

3,231,561
FATTY ACID SUGAR ESTERS AND FATTY ACID SUGAR-BORON ESTERS
Thomas E. Brunelle, St. Paul, Larry M. Rue, South St. Paul, and Samuel B. Crecelius, St. Paul, Minn., assignors to Economics Laboratory, Inc., St. Paul, Minn., a corporation of Delaware
No Drawing. Filed Jan. 3, 1962, Ser. No. 164,176
12 Claims. (Cl. 260—234)

This invention relates to new compositions of matter which are particularly advantageous for use as surfactants and detergents and to processes of preparing compositions of matter having surface active and detergent properties.

Fatty acid esters of carbohydrates such as sucrose, glucose and the like are known to the art to be useful for a large variety of applications. For example, such esters have been employed experimentally as additives in food, for emulsifying salad dressings and other food products. Experiments have shown them to be useful also in the diets of people who have difficulty in digesting fat to aid in the absorption of fat in the digestive tract. In addition, these fatty acid sugar esters find wide application as surfactants and detergents. The bio-degradable nature of these ester materials enhance their utility as surfactants and detergents in locatlities where serious disposal problems are encountered with the use of conventional materials.

The known methods of preparing these fatty acid sugar esters generally involve the use of expensive and relatively scarce solvents such as dimethylformamide and dimethylsulfoxide to dissolve the saccharide or sugar in order to convert it to a reactive state. The sugars are then reacted with esters of fatty acids through an ester interchange mechanism to form the desired sugar esters. The high cost and toxic nature of solvents such as dimethylformamide make these known processes commercially unattracitve.

According to other prior art methods, sugar esters are prepared by reacting a sugar with a fatty acid halide in the presence of a solvent such as pyridine, which serves as an acceptor for the hydrogen halides which are formed. Again, these solvents are rather costly and it is usually difficult to remove the solvents from the sugar ester product due to the generally high boiling points of the solvents. Their removal by evaporation necessitates excessive temperatures which often cause adverse effects on the organic ester such as charring, discoloration and the like. It is thus highly desirable to provide a process for producing fatty acid sugar esters utilizing solvent reaction media which are relatively inexpensive and abundant in supply and which are not of a highly toxic nature as well as being readily removable from the sugar ester product. These desiderata are achieved by the present invention.

In accordance with the present invention fatty acid esters of carbohydrates are prepared utilizing glacial acetic acid as the solvent which comprises the reaction medium. While glacial acetic acid is a comparatively inexpensive and abundant solvent, it could not be used heretofore as a solvent reaction medium for the preparation of sugar esters because of its inability to dissolve sugars as is known in the art. We have found that solvation of saccharides or sugars in glacial acetic acid is made possible by reacting compounds of boron with the sugar to form soluble sugar-borate complexes which are readily soluble in glacial acetic acid. These sugar-borate complexes remain soluble in glacial acetic acid at temperatures as low as about 15° C. The reaction of a sugar with boric acid may be illustrated as follows:

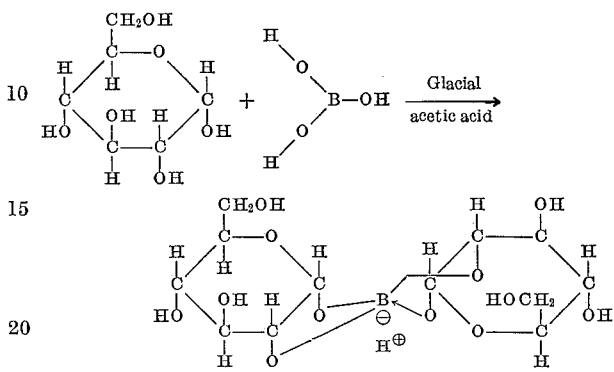

The boron compounds which are used for reaction with the sugars include orthoboric acid, metaboric acid and boron oxide. These boron compounds are employed in amounts from about 0.05 to 0.40 part by weight per part of sugar. Reaction of the sugar with the boron compound to form the sugar-borate complexes is conducted at temperatures from about 85° C. to 115° C. for periods ranging from about 15 minutes to 60 minutes.

It is essential that the glacial acetic acid be employed in amounts sufficient to accomplish its indicated functions and we prefer to employ the glacial acetic acid solvent in amounts ranging from about 4.00 to about 8.00 parts by weight per part of sugar and most preferably from 4.36 to 4.74.

After formation of the sugar-borate complexes an esterification reaction is carried out in accordance with the present invention by reaction of the sugar-borate complex with a fatty acid halide such as a chloride, bromide or iodide with the chloride being preferred. For this reaction the fatty acid halide is employed in molecular proportions equal to that of the original sugar employed. While we do not wish to be bound by an theoretical explanation of what occurs, it is hypothesized that the fatty acid halide first reacts with a portion of the glacial acetic acid to form a mixed anhydride of the glacial acetic acid and the fatty acid employed. This mixed anhydride is soluble in the remaining glacial acetic acid. When this reaction occurs a hydrogen halide is formed which can be easily removed from the system by application of a vacuum thereto. With continued agitation and heating at temperatures in the range from about 25–50° C., the mixed fatty acid-glacial acetic acid anhydride reacts with the sugar-borate complex to form a fatty acid ester of the sugar-borate complex and to free the glacial acetic acid. The glacial acetic acid can then easily be removed from the system by distillation at reduced pressure, condensed and recovered for further use. After removal of the glacial acetic acid, a fatty acid monoester of the sugar-borate complex remains. These fatty acid esters of the sugar-borate complexes thus produced are new compounds and we have found them to be eminently satisfactory for use as surface active agents and detergents. The surface active and detergent characteristics of the fatty acid sugar-borate esters are discussed in more detail hereinafter.

Support for the above suggested reaction mechanism is found in the fact that various mixed anhydrides of the fatty acid and acetic acid have been isolated from reaction mixtures which have not gone to completion.

Conventional fatty acid sugar esters can be readily obtained from these new fatty acid sugar-borate esters by removal of the boron therefrom. This can be readily accomplished by treating the fatty acid ester of the sugar-borate complex with a lower $C_1$-$C_4$ alcohol, preferably methyl or ethyl, and heating to temperatures slightly below the boiling point of the alcohol. For this purpose the lower alcohol is employed in amounts in excess of about 3 moles of alcohol per mole of boron in the complex. The lower alcohol reacts with the boron of the complex to form a borate such as methyl or ethyl borate which can be readily distilled off leaving the fatty acid ester of the sugar. At atmospheric pressure, temperatures of about 100° C. or above and lower temperatures at reduced pressures are suitable for removing the methyl or ethyl borate esters. These fatty acid sugar esters have a wide variety of uses as indicated previously.

The aforedescribed method of preparing the fatty acid sugar esters possesses numerous significant advantages. First, the conventional sugar esters can be prepared economically using relatively inexpensive reactants and solvents. Second, novel intermediate ester compounds are formed which themselves have utility. Moreover, the described method of preparation favors the production of monoesters of the sugar as is desired since two of the available hydroxyls of the sugar molecule are blocked by the formation of the sugar-borate complex. A further advantage is that formation of a sugar-borate complex results in improved heat stability of the sugar molecule with less darkening and decomposition occurring in the product than is generaly obtained when a free sugar molecule is heated under acid conditions.

The sugars which are employed to form the ester compounds of the invention are the mono-, di-, tri- and tetra- saccharides. Representative sugars thus include glucose, sucrose, lactose, maltose, trehalose, glucoxylose, raffinose, melezitose, gentianose, stachyose and other pentoses, hexoses, heptoses and the like.

The length of the fatty acid chain of the esters can be varied as desired. Generally for the production of fatty sugar esters useful as surfactants and detergents fatty acids containing from about 6 to 24 carbon atoms are most useful, with the preferred being those acids containing from 10 to 18 carbon atoms. Thus, representative fatty acids which may constitute the fatty acid moiety of the ester compounds of this invention are the saturated fatty acids including: caproic, caprylic, lauric, myristic, palmitic, stearic; the unsaturated fatty acids including dodecylenic, palmitoleic, oleic, linoleic, linolenic or mixtures of these acids. Mixed fatty acids which occur as industrial by-products such as refined tall oil fatty acid as well as mixed fatty acids obtained from naturally occurring glyceridic oils and fats can also be used to produce the ester compounds of this invention. Such glyceridic fats and oils include tallow, coconut oil, sperm whale oil, lard, lard oil, cocoa butter, palm oil, dehydrated caster oil, corn oil, soya bean oil, herring oil and so forth.

The invention is further illustrated by the following specific examples which are not to be considered as limitative thereof.

EXAMPLE I

In a 500 ml. reaction flask, 36.0 gm. of glucose (commercial dextrose), 6.18 g. of orthoboric acid, and 157.35 g. of glacial acetic acid were added. The flask was equipped with sealed stirrer, heating mantle, thermometer and vacuum distillation apparatus. The reaction was heated to a temperature of 100–105° C. with agitation during a period of 30 minutes. At this temperature a homogeneous solution was obtained. The reaction solution was maintained at this temperature for an additional 20 minutes and then cooled to 25–35° C. At this point dropwise addition of 38.1 g. of capric acid chloride was begun with continued agitation. This addition required approximately 45 minutes and was accompanied by a 15° C. rise in temperature. The reaction solution was then agitated for 30 minutes after which a vacuum of 30–50 mm. of mercury was applied to the system and agitation continued.

With the first application of the vacuum, gaseous hydrogen chloride began to come out of the solution vigorously. This effervescence of hydrogen chloride lasted about 5 minutes. Heat was then applied to the system and glacial acetic acid began to distill over into the receiver. At the end of 3 hours, the temperature had risen to 115° C. and the removal of acetic acid was virtually complete. The resultant product was a brownish viscous liquid which was the crude fatty acid ester of the glucose borate complex. Ninety-six percent (96%) of the total glacial acetic acid used was recovered. The crude product on cooling to room temperature solidified into a waxy solid.

EXAMPLE II

One half by weight of the produce obtained in Example I was taken up in 40 g. of anhydrous methanol. The solution was then heated on a bath under vacuum until all the methyl borate and the excess methanol had been removed. This gave a product, free of boron by test, which was the glucose caprate ester.

EXAMPLE III

Into the same apparatus as described in Example I, 36 g. glucose, 6.18 g. boric acid, 157.3 g. of glacial acetic acid were introduced and treated in the same manner as in that example. Approximately 43.75 grams of lauric acid chloride were added and the reaction mixture was then treated as described in Example I until the crude glucose laurate borate complex was obtained.

EXAMPLE IV

The crude product from Example III was treated with methyl alcohol in the same manner as described in Example II and the free glucose laurate was obtained.

EXAMPLE V

A 36 g. sample of glucose, 6.18 g. of boric acid, and 157.35 g. of glacial acetic acid were weighed into the same apparatus as described in Example I. The same procedure was followed as that described in Example I with the exception that 49.36 g. of myristic acid chloride was added to obtain the glucose myristate borate complex.

EXAMPLE VI

Approximately one-half of the glucose myristate borate complex of Example V was treated in the same manner with anhydrous methanol as described in Example II and the free glucose myristate obtained.

EXAMPLE VII

A 34.2 g. sample of commercial surcrose was added to the same apparatus as described in Example I along with 157.3 g. of glacial acetic acid and 9.2 g. orthoboric acid. The same procedure was used to form the sucrose borate complex solution as that followed in Example I. At this point, 24.68 gm. of myristic acid chloride was added to the reaction mixture and the same procedure followed throughout as described in Example I. Approximately 96% of the glacial acetic acid was recovered and a crude borate complex of the sucrose myristate ester was obtained.

EXAMPLE VIII

Approximately one-half of the product from Example VII was treated with anhydrous methyl alcohol in the same manner described in Example II and the free sucrose myristate was obtained.

Properties of the chemical compounds produced in the above examples are shown in the following Table I.

*Table I*

| Compound | Melting Point, °C. | Surface tension at 0.1% Conc., dyne/cm. | Appearance |
|---|---|---|---|
| Glucose caprate borate complex of Example I. | 136-138 | 32.5 | Fine light colored powder when ground. Very hydroscopic. |
| Glucose caprate purified (Ex. II). | 35-37 | 31.5 | Do. |
| Glucose laurate borate complex of Example III. | 57-60 | 29.4 | Do. |
| Glucose laurate purified (Ex. IV). | 32-36 | 29.4 | Fine light colored powder, but tends toward syrup. Very hydroscopic. |
| Glucose myristate borate complex of Example V. | 48-50 | 31.4 | Fine light powder when ground. Very hydroscopic. |
| Glucose myristate purified (Ex. VI). | 25-28 | 29.2 | Heavy syrup forms. Hard to crystalize. Very hydroscopic. |
| Sucrose myristate borate complex of Example VII. | [1] 210 | 29.7 | When washed with petroleum ether it gave a free-flowing powder. |
| Sucrose myristate purified (Ex. VIII). | 35-40 | 31.0 | Powdered fine when ground, however goes to syrup. Hydroscopic. |

[1] Darkening with decomp.

As stated, the sugar ester compounds of the present invention possess excellent detergent, wetting and dispersing properties. These ester compounds produced in accordance with the invention can thus be advantageously employed as detergents in general and with particularly advantageous results in those applications where bio-degradable detergents are desired. The sugar esters of the invention can be used for human cleanliness or for washing clothes, disher, etc. When used for washing clothes the sugar esters of this invention can be admixed with the various detergent aids commonly employed in "built" laundry detergent compositions. Examples of these detergent aids are the molecularly dehydrated phosphates, the alkali-metal phosphates, alkali-metal silicates, sulfates, carbonates, carboxymethylcellulose and the like. Esters of the sugar-borate complex of the invention are employed in laundry detergent compositions in amounts ranging from about 7.5 percent to 30 percent by weight.

To illustrate the use of the esters of the sugar-borate complexes of the present invention in laundry type detergent compositions, the following compositions were formulated (parts of each ingredient are by weight):

*Table II*

| Formulation | Product of Invention | Sodium Tripolyphosphate | Sodium Meta-Silicate | Carboxy Methyl Cellulose | Dense Ash | Sodium Lauryl Sulfate |
|---|---|---|---|---|---|---|
| A | 15 Ex. I | 55 | 20 | 1.15 | 8.85 | 0 |
| B | 15 Ex. III | 55 | 20 | 1.15 | 8.85 | 0 |
| C | 15 Ex. V | 55 | 20 | 1.15 | 8.85 | 0 |
| D | 30 Ex. I | 40 | 20 | 1.15 | 8.85 | 0 |
| E | 30 Ex. III | 40 | 20 | 1.15 | 8.85 | 0 |
| F | 30 Ex. V | 40 | 20 | 1.15 | 8.85 | 0 |
| G | 7.5 Ex. I | 55 | 20 | 1.15 | 8.85 | 7.5 |
| H | 7.5 Ex. III | 55 | 20 | 1.15 | 8.85 | 7.5 |
| I | 7.5 Ex. V | 55 | 20 | 1.15 | 8.85 | 7.5 |

These above formulations were then tested by means of a standard Launder-Ometer under the following conditions:

Water temperature _____ 140° F.
Wash time _____ 10 min.
Detergent concentration _____ 0.2%.
Mechanical action _____ 10 rubber balls/jar.
Rinse _____ One warm water hand rinse.
Water source _____ Soft (96 p.p.m.); hard (270 p.p.m.).

Two widely used commercial detergents were used for comparison and the results were as follows:

*Table III*

| Formulation | PERCENT SOIL REMOVAL | | | | | |
|---|---|---|---|---|---|---|
| | ACH Cotton | | T.F. Wool | | T.F. Nylon | |
| | Hard Water | Soft Water | Hard Water | Soft Water | Hard Water | Soft Water |
| A | 23.4 | 23.3 | 19.8 | 22.4 | 10.4 | 16.5 |
| B | 24.5 | 20.3 | 21.3 | 23.1 | 14.0 | 22.7 |
| C | 26.0 | 22.5 | 21.2 | 26.5 | 42.1 | 44.5 |
| D | 16.3 | 22.4 | 21.2 | 26.2 | 0.0 | 9.5 |
| E | 23.9 | 23.9 | 18.1 | 25.9 | 0.0 | 13.9 |
| F | 21.4 | 23.9 | 21.4 | 25.7 | 28.8 | 43.7 |
| G | 26.9 | 24.5 | 19.6 | 26.2 | 41.5 | 48.1 |
| H | 28.7 | 26.1 | 20.4 | 25.5 | 40.5 | 49.2 |
| I | 22.7 | 25.4 | 20.0 | 26.6 | 42.2 | 50.2 |
| Commercial Det. I | 12.3 | 25.8 | 16.0 | 35.2 | 5.9 | 14.5 |
| Commercial Det. II | 25.7 | 9.2 | 18.3 | 19.8 | 7.8 | 44.8 |

The foregoing description and experimental data clearly evidence the numerous advantages of the present invention. Among the significant advantages of the invention which may be mentioned are: (1) conventional fatty acid sugar esters can be economically prepared utilizing inexpensive and abundant materials, (2) the solvent employed as the reaction medium is relatively abundant, not highly toxic and readily separable from the ester product; solvent recovery being about 95 percent, (3) novel intermediate ester products are produced which themselves are admirably suited for use as surfactants and detergents, (4) the sugar esters of the invention demonstrate superior detergency properties when compared with commonly used prior art detergents, (5) the sugar ester detergents are bio-degradable, and (6) they are suitable for use in combination with conventional detergent aids.

Those modifications and equivalents which fall within the spirit of the invention and the scope of the appended claims are to be considered part of the invention.

We claim:

1. A process for preparing a new composition of matter which comprises reacting in the presence of glacial acetic acid as the solvent reaction medium a saccharide with a reactable boron compound to form a reaction product soluble in glacial acetic acid, reacting a fatty acid halide with said reaction product to form a fatty acid ester of the saccharide-boron reaction product, and removing glacial acetic acid from said fatty acid ester product.

2. The process of claim 1 wherein the fatty acid is one containing from about 8 to 18 carbon atoms.

3. The process of claim 1 wherein the reactable boron compound is orthoboric acid.

4. The process of claim 1 wherein the saccharide is glucose.

5. The process of claim 1 wherein the saccharide is sucrose.

6. The process of claim 1 wherein the fatty acid halide is a mixed fatty acid halide.

7. A fatty acid ester product resulting from the process of claim 1.

8. A process for producing esters of fatty acids and saccharides which comprises reacting in the presence of glacial acetic acid as the solvent reaction medium a saccharide with a reactable boron compound to form a reaction product soluble in glacial acetic acid, reacting a fatty acid halide with said reaction product to form a fatty acid ester of the saccharide-boron reaction product, heating said fatty ester of the saccharide-boron reaction product with a lower monohydric alcohol to form a borate ester with the alcohol, and removing said last-mentioned ester from the reaction mixture by distillation.

9. The process of claim 8 wherein the fatty acid is one containing from about 8 to 18 carbon atoms.

10. The process of claim 8 wherein the reactable boron compound is orthoboric acid.

11. The process of claim 8 wherein the saccharide is glucose.

12. The process of claim 8 wherein the saccharide is sucrose.

References Cited by the Examiner
UNITED STATES PATENTS

| | | | |
|---|---|---|---|
| 829,478 | 8/1906 | Lichtenstein | 260—234 |
| 1,685,220 | 9/1928 | Middleton | 260—234 |
| 2,473,822 | 6/1949 | Robinson | 252—135 |
| 2,686,779 | 5/1954 | Jones | 260—234 |
| 2,746,930 | 5/1956 | Wells et al. | 252—135 |
| 2,992,082 | 7/1961 | Ownby et al. | 44—66 |
| 2,999,858 | 9/1961 | Curtis | 260—234 |
| 3,038,895 | 6/1962 | Rutenberg et al. | 260—234 |
| 3,067,192 | 12/1962 | Emrick | 260—234 |

OTHER REFERENCES

Krejci et al.: "Arch. Biochem.," vol. 22 (June 1949), pp. 253–261.

LEWIS GOTTS, *Primary Examiner.*

JULIUS GREENWALD, *Examiner.*

UNITED STATES PATENT OFFICE
CERTIFICATE OF CORRECTION

Patent No. 3,231,561　　　　　　　　　　　　　January 25, 1966

Thomas E. Brunelle et al.

It is hereby certified that error appears in the above numbered patent requiring correction and that the said Letters Patent should read as corrected below.

Column 2, lines 8 to 14, the structural formula should appear as shown below instead of as in the patent:

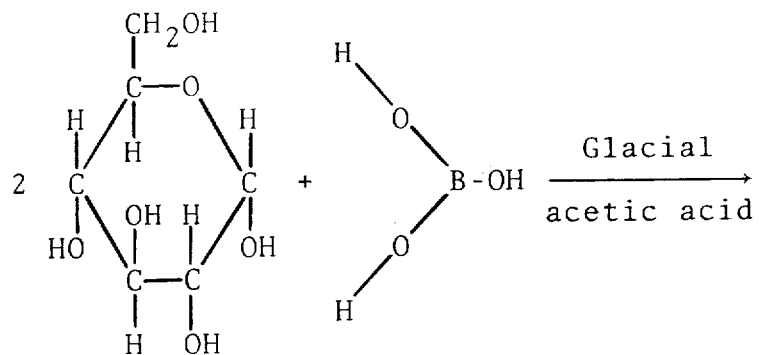

Signed and sealed this 20th day of December 1966.

(SEAL)
Attest:

ERNEST W. SWIDER　　　　　　　　　　　　　EDWARD J. BRENNER
Attesting Officer　　　　　　　　　　　　Commissioner of Patents